Sept. 2, 1924.
J. T. AUGER
BRAKE
Filed Dec. 16, 1921
1,506,965
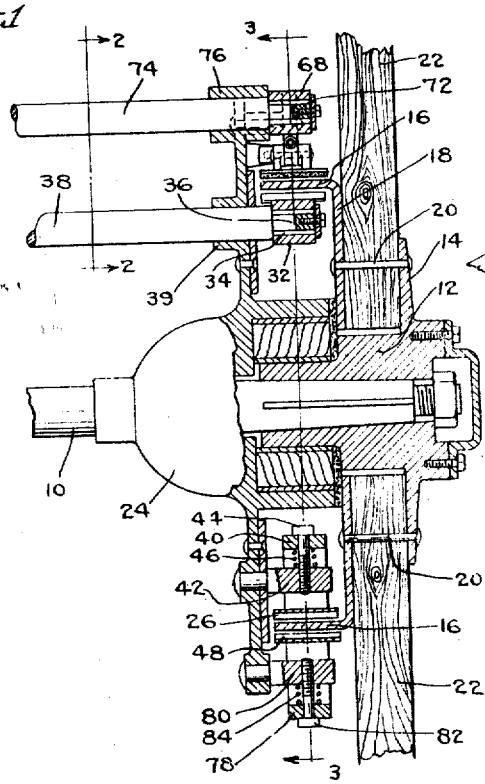
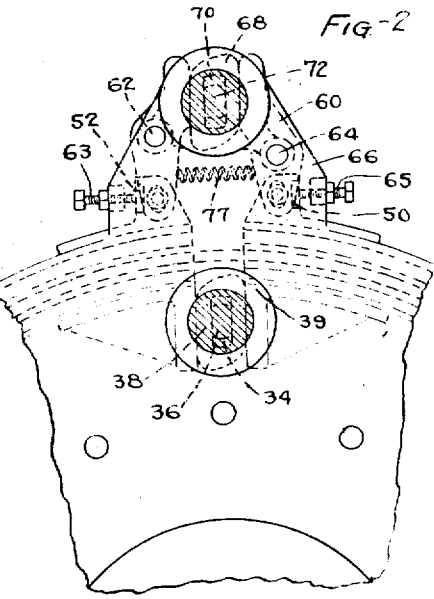
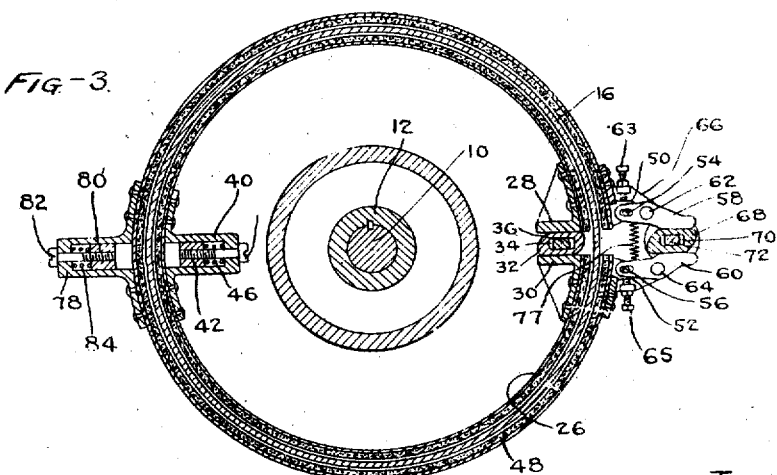
INVENTOR.
JOSEPH T. AUGER.
By Whiteley and Rickman
ATTORNEYS.

Patented Sept. 2, 1924.

1,506,965

UNITED STATES PATENT OFFICE.

JOSEPH T. AUGER, OF MINNEAPOLIS, MINNESOTA, ASSIGNOR OF ONE-HALF TO ROBERT H. MONAHAN, OF MINNEAPOLIS, MINNESOTA.

BRAKE.

Application filed December 16, 1921. Serial No. 522,760.

*To all whom it may concern:*

Be it known that I, JOSEPH T. AUGER, a citizen of the United States, residing at Minneapolis, in the county of Hennepin and State of Minnesota, have invented certain new and useful Improvements in Brakes, of which the following is a specification.

My invention relates to brakes and particularly to brakes for use in connection with motor vehicles. While designed especially for application to motor vehicles, it will be obvious that the brake may be used in other relations. An object is to provide a construction embodying a brake band which cooperates with a brake drum, and in which the brake band extends for nearly a complete circumference and has ends slightly spaced apart with means operating upon both of the ends with an equalizing action which causes the two semi-circular portions of the band extending at both sides from the gap in the band to be applied with equal force to the brake drum even though such semi-circular portions may not be of exactly the same length, and also regardless of whether or not the operating means at the beginning of its movement is positioned in such manner as to cause uniform operation of the brake band for its entire circumference. By means of the equalizing device which I provide, any such defect in operation is quickly overcome before the brake is set to an appreciable extent. The result of this manner of operating the brake is to prevent unequal wear of the braking surfaces and to obtain a much more efficient braking action. Another object is to provide a single brake drum with which cooperates a pair of brake bands which may be utilized as a service brake and an emergency brake, and both of which operate in accordance with the principle above stated.

The full objects and advantages of my invention will appear in connection with the detailed description, and the novel features embodied in my inventive idea will be pointed out in the claim.

In the accompanying drawings which illustrate the application of my invention in one of the forms in which it may be embodied, Fig. 1 is a view of the brake mostly in central section. Fig. 2 is a view in section on the line 2—2 of Fig. 1. Fig. 3 is a view in section on the line 3—3 of Fig. 1.

Referring to the construction illustrated in the drawings in which my brake is shown in connection with a wheel of a motor vehicle, the numeral 10 designates the axle upon which is mounted a rear wheel having a hub 12 provided with an annular flange 14. A brake drum 16 is provided with an inwardly extending annular flange 18 and this brake drum is secured to the wheel by bolts 20 passing through the flange 18 through the spokes 22 and through the flange 14. Connected with the frame of the motor vehicle is a support 24 through which the axle 10 extends and which holds the bearing therefor. It will be understood that the same construction may be provided at both ends of the axle and hence, it will be sufficient to disclose only the construction employed in connection with one of the rear wheels. Adapted to cooperate with the internal surface of the brake drum 16 is an internal brake band 26 which extends for nearly a complete circumference, and, at its ends is provided with inwardly extending flanges 28 and 30 which are spaced from each other sufficiently so that a double ended cam 32 engages the adjacent faces of the flanges. This cam is provided with a slot 34 which receives a flattened portion 36 on the end of a rod 38 which is rotatably mounted in a bearing 39 carried by an extension of the support 24. The slot 34 is longer than the width of the flat portion 36 so as to constitute an equalizing slot as will more fully appear in connection with the statement of operation. The shaft 38 may be rocked to operate the cam 32 in customary manner by means located within reach of the driver when the brake is applied to a motor vehicle. Secured to the middle portion of the brake band 26 is an inwardly extending yoke member 40 which fits slidably upon an arm 42 secured to an extended portion of the support 24. Extending slidably through the end portion of the yoke member 40 is a bolt 44, the inner portion of which is threaded into the arm 42. A spring 46 interposed between the arm 42 and the end portion of the yoke member serves to hold the adjacent portion of the brake band from contact with the surface of the brake drum when the brake band is not operated but when the band is forced into braking position, the spring 46 is readily compressed so that the whole interior surface of the band may be engaged with the drum. Adapted to cooperate with the external surface of the brake drum 16 is an external brake band 48 which extends for nearly a complete circumference and at its ends is provided with pairs of ears 50 and 52. These ears carry pins 54 and 56 respectively which are received in slots formed in the inner ends of lever arms 58 and 60. Adjustable set bolts 63 and 65 serve to adjustably hold the ends of the levers 58 and 60. These levers are pivotally attached at 62 and 64 to a lug 66 which is carried by an extension of the support 24. As will be apparent from Figs. 2 and 3, the lug 66 has angular portions through which the bolts 63 and 65 are threaded and held in adjusted position by lock nuts. The outer ends of the levers 58 and 60 are spaced from each other sufficiently to receive between them a double ended cam 68 which has a slot 70 to receive a flattened portion 72 on the end of a rod 74 which is rotatably mounted in a bearing 76 carried by the extended portion of the support 24. A spring 77 between the inner arms of the levers 58 and 60 holds the outer arms thereof in engagement with the cam 68. The slot 70 is longer than the width of the flat portion 72 so as to form an equalizing slot in similar manner to the slot 34 previously mentioned. The shaft 74 may be rocked to operate the cam 68 in customary manner by means located within reach of the driver when the brake is used in connection with a motor vehicle. Secured to the middle portion of the brake band 48 is an outwardly extending yoke member 78 which fits slidably upon an arm 80 secured to the extended portion of the support 24. Extending slidably through the end portion of the yoke member 78 is a bolt 82, the inner portion of which is threaded into the arm 80. A spring 84 interposed between the arm 80 and the end portion of the yoke member serves to hold the adjacent portion of the brake band from contact with the external surface of the brake drum when the band is not operated, but, when the band is forced into braking position, the spring 84 is readily compressed so that the whole interior surface of the band may be engaged with the drum.

The operation and advantages of my invention will be obvious from the foregoing description. In case the brake is applied to a motor vehicle, one of the brake bands may be operated by foot power to constitute a service brake while the other brake band may be operated by a hand lever to constitute an emergency brake. It is obvious that for some purposes either the internal brake band or the external brake band may be mounted alone for operation with the brake drum. The slots 34 and 70 constitute what I term equalizing slots. The cams 32 and 68 when the brake is off will ordinarily occupy a position such that the flattened portions 36 and 72 will be centrally located in the slots. When the cams are rotated to apply the brakes, they may slide in either direction sufficiently to insure equalization of the force with which the two semi-circular portions of the bands are applied. The manner in which the middle portions of the bands are supported allows the bands to be brought into contact with the brake drum with a force equally distributed around this drum. This prevents unequal wearing of the braking surface of the bands and results in extremely efficient braking action. It is obvious that any suitable brake lining may be employed to constitute the braking surface of the bands. When the cams 32 and 68 are placed in their non-braking position, the springs 46 and 84 are of the proper strength and so adjusted that the brake bands are removed from engagement with the brake drum substantially uniformly around its surface.

I claim:

A brake comprising a brake drum, a brake band arranged to cooperate therewith, said band extending for nearly a complete circumference, means for resiliently holding the middle portion of said band, said means operating to remove said band from engagement with said drum when the brake is off and to permit said band to move into engagement with said drum when the brake is on, ears secured to the respective ends of said band, pins carried by said ears, levers intermediately pivoted to a fixed support, the inner arms of said levers having slots which receive said pins, a double-ended cam between the outer arms of said levers, a spring for holding said outer arms in engagement with said cam, said cam having a slot, and an operating member in said slot upon which said cam may slide, said slot and operating member constituting an equalizing device which causes all portions of said band to be applied with equal force to said drum.

In testimony whereof I hereunto affix my signature.

JOSEPH T. AUGER.